United States Patent [19]

Farmer

[11] Patent Number: 4,498,809
[45] Date of Patent: Feb. 12, 1985

[54] FLOW COMPENSATED COMPUTING CONTROLLER

[76] Inventor: Edward J. Farmer, 839 Shoreside Dr., Sacramento, Calif. 95825

[21] Appl. No.: 505,941

[22] Filed: Jun. 20, 1983

[51] Int. Cl.³ .............................. E02B 7/20; E02B 7/40
[52] U.S. Cl. ...................................... 405/92; 137/386; 405/37
[58] Field of Search .............................. 405/36, 37, 92; 137/386, 392, 399, 409, 41, 87, 426

[56] References Cited

U.S. PATENT DOCUMENTS

| 2,667,748 | 2/1954 | Heath | 405/92 |
| 2,746,480 | 5/1956 | Hildyard | 137/386 |
| 3,338,261 | 8/1967 | Bergeson et al. | 137/386 |
| 3,922,564 | 11/1975 | Kachuk et al. | 137/392 |
| 4,036,023 | 7/1977 | Matsumoto et al. | 405/92 |
| 4,332,507 | 6/1982 | Wakamori et al. | 405/92 |

Primary Examiner—Dennis L. Taylor
Attorney, Agent, or Firm—Mark C. Jacobs

[57] ABSTRACT

A flow compensated controller for use in automatically controlling the water level in an open channel is disclosed. An electrical signal received from a transducer at a measuring location and corresponding to the actual water level in the channel at that location is amplified and compared with an amplified signal corresponding to the desired water level. An error signal corresponding to the difference between the two signals is fed into a proportional amplifier and also into an automatic reset unit. The outputs of the proportional amplifier and the automatic reset unit are fed into a summing amplifier. The output of the summing amplifier is fed into a motor modulation driver whose output is connected to a pair of gate operator relays, one relay connected for sending a control signal to the gate operator to move the gate in one direction and the other relay connected for sending a control signal to the gate operator to move the gate in the other direction. The two relays are connected to the gate operator through a third relay which is controlled by an oscillator driven time proportioning comparator which enables the control power to the gate operator at one portion of the time and disables the control power to the gate operator during the other portion of the time in order to allow the water level to stabilize after the gate position has been changed. During the disable period the time proportioning comparator also disables the automatic reset unit so that it is not integrating.

8 Claims, 5 Drawing Figures

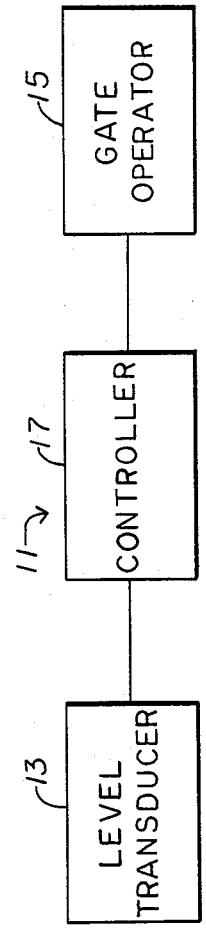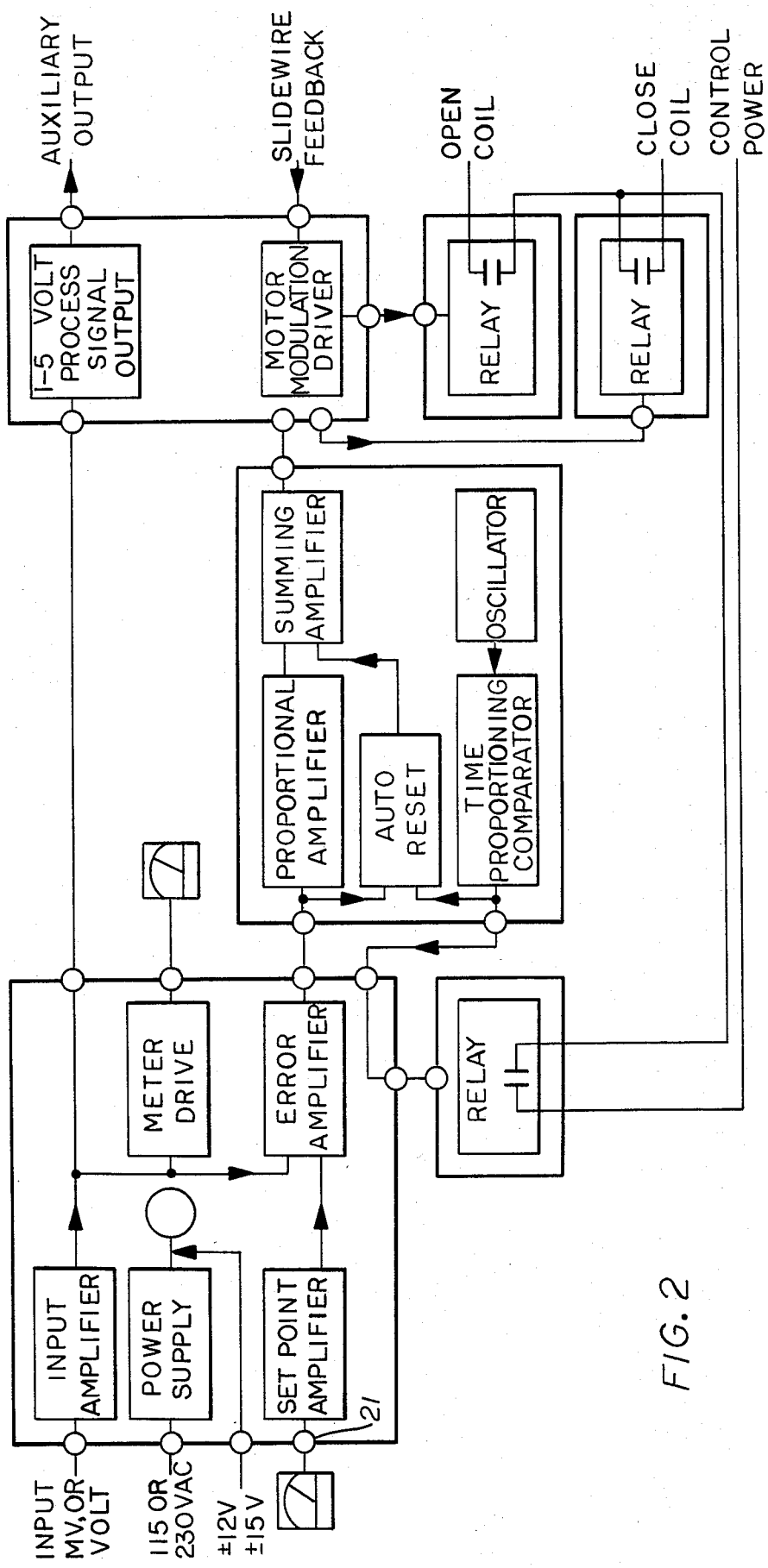

4,498,809

FLOW COMPENSATED COMPUTING CONTROLLER

BACKGROUND OF THE INVENTION

The present invention relates generally to an automatic computing controller for controlling the water level upstream or downstream of a control gate in an open channel, such as an irrigation canal, and more particularly to a controller of this type which is constructed to operate on a cyclic basis to allow the effect of a change made in the control gate position to be observable at the location where the water level is being monitored.

In open channels, such as irrigation canals it is desirable that the water level be maintained constant or as close to constant as possible at all times. If the water level is below that constant, the users of the water may not obtain a sufficient amount of water at a desired time to satisfy their needs. On the other hand, if the water rises too much above the constant level, the excess may spill off out of the canal and be wasted. Generally, the water in an open channel is maintained at a constant or close to a constant level by adjusting a control gate, which controls the amount of water fed into the canal, to compensate for the water taken out of the canal by the water users. The control gates are raised or lowered by gate operator units.

Initially, these gate operator units were adusted manually by a canal tender or water master as they are sometimes called. More rescently, however, devices or systems have been constructed for automatically operating the gate operator to make the necessity for a man who formerly made the adjustments needed to maintain the constant water level outmoded. Generally, such devices have included a transducer located upstream or downstream from the control gate which generates an electrical signal corresponding to the actual water level at that location and a control unit which controls the operation of the gate operator in response to the signal received from the transducer.

One of the shortcomings of the prior art automatic controllers is that they have not fully or entirely satisfactorily taken into effect the fact that the water level in the canal does not change at the same instant as the control gate is moved. For example, if the transducer is located a mile or two downstream from the control gate it may take as much as two to four minutes before a change in gate position produces the corresponding change in the water level at the transducer location. This time period is often referred to as "dead time". As can be appreciated, because of the dead time period, a controller responding continuously to input signals from the transducer will always be operating "ahead of" the canal. One way to try to minimize the "dead time" period is to position the transducer close to the control gate. However, because of the turbulence in the vicinity of the control gate, this arrangement is simply not workable.

In U.S. Pat. No. 4,036,023 to K. Matsumato et al there is disclosed a flood control system for a dam which provides for measuring the actual water level of the dam and for calculating the deviation value between a set reference water level and the actual water level. Proportional position control over the gate angle is then performed in response to the calculated water deviation level and means is provided for determining the outflow of water to be discharged from the dam in response to the value obtained by this control.

In U.S. Pat. No. 4,180,083 to S. Miyaoka et al a system for controlling flow rate in pipelines connecting a plurality of reservoirs is disclosed. Flow rate Q (t) of fluid flowing from one reservoir (i) to another reservoir (j) is first calculated from the water levels H (t), H (t) of both reservoirs (i), (j) and then water level H (t+1) of the reservoir (j) at the time (t+1) is calculated from its inflow and outflow taking into account the predicted amount of demand Q (t). If the water level H (t+1) is below or over the predetermined lower or upper limitation, manipulated variables for valves and pumps installed in pipelines are regulated to control inflow of the reservoir (j) so that the required fluid-feed is satisfied while maintaining the scheduled water level of the reservoir (j).

In U.S. Pat. No. 2,041,576 to A. Suksdorf there is disclosed a system for controlling the levels of fluid bodies comprising, valve means for controlling the communication between said bodies, means responsive to level of one of said bodies for controlling the opening of said valve, means responsive to the level of the other of said bodies for controlling the opening of said valve, and interlocking means controlled by both of said level responsive means for limiting the operation of said valve by one of said level responsive means to limits determined by the other of said level responsive means.

In U.S. Pat. No. 3,466,872 to Y. Shimuzu there is disclosed an apparatus for regulating water flow in a part of a channel downstream of a gate therein, comprising a float rising and falling with the water level at a station in said channel part remote from said gate; a motor for opening and closing said gate; first and second electric motor circuits including first and second normally open switches, respectively, with said first and second circuits, when closed, causing the motor to move said gate in opening and closing directions, respectively; first control means including said float, operative to cause closure of said first and second switches when the water level at said station is below and above predetermined lower and upper limits, respectively, and to maintain said first and second switches closed until the water level at said station is restored to said predetermined lower and upper limits, respectively; and a device including a timer and operative on and during closure of either of said first and second switches cyclically to close and open the respective motor circuit after predetermined time intervals, respectively.

In U.S. Pat. No. 4,073,147 to T. Nomura there is disclosed a water gate control system which selects either the automatic mode or forced mode. In the automatic mode the gate is automatically swung depending upon the level of a stream or water-way between the upright or closing position and the or opening position by a single or double acting hydraulic cylinder in which a directly or indirectly spring loaded piston is displaced depending upon the hydraulic pressure acting on the gate, and in the forced mode, the working oil under pressure being introduced into the hydraulic cylinder for swinging the gate to and holding it in a desired angular position independently of the level.

Other known patents of interest are U.S. Pat. No. 3,498,395 to N. R. Henry; U.S. Pat. No. 3,012,373 to J. H. Willis; U.S. Pat. No. 3,338,261 to R. L. Bergeson et al; U.S. Pat. No. 3,873,002 to J. R. Davidson et al; U.S. Pat. No. 3,303,967 to W. A. Munson; U.S. Pat. No.

2,796,197 to L. G. Criddle; U.S. Pat. No. 1,582,715 to R. J. Wensley; and U.S. Pat. No. 1,744,455 to F. Duwe.

It is an object of this invention to provide a new and improved controller for controlling the position of a control gate in an open channel.

It is another object of this invention to provide a controller for operating a control gate in an open channel which is constructed to compensate for dead time.

The foregoing and other objects and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the cope of the present invention is best defined by the appended claims.

SUMMARY OF THE INVENTION

A flow compensated controller for use in automatically controlling the water level in an open channel. An electrical signal received from a transducer at a measuring location and corresponding to the actual water level in the channel at that location is amplified and compared with an amplified signal corresponding to the desired water level. An error signal corresponding to the difference between the two signals is fed into a proportional amplifier and also an automatic reset unit. The outputs of the proportional amplifier and the automatic reset unit are fed into a summing amplifier. The output of the summing amplifier is fed into a motor modulation driver whose output is connected to a pair of gate operator relays, one relay for responding to a control signal for causing the gate operator to move the gate in one direction and the other relay for causing the gate operator to move the gate in the other direction. The two relays are connected to the gate operator through a third relay which is controlled by an oscillator driven time proportioning comparator which enables the control power to the gate operator at one portion of the time and disables the control power to the gate operator during the other portion of the time to allow a change made by the gate to be observable at the measuring location. During the off time the time proportioning comparator also disables the automatic reset unit so that it does not integrate.

One advantage of the invention is that it reduces spillage.

Another advantage of the invention is that it reduces operating costs by eliminating most if not all of the work done by the water master.

BRIEF DESCRIPTION OF THE DRAWINGS

In order that the invention may be more fully understood, it will now be described, by way of example, with reference to the accompanying drawing in which like reference numerals or characters represent like parts:

FIG. 1 is a block diagram of a control system constructed according to the teachings of the present invention;

FIG. 2 is a block diagram of the controller shown in FIG. 1;

DETAILED DESCRIPTION OF PREFERRED EMBODIMENT

Figure 3:
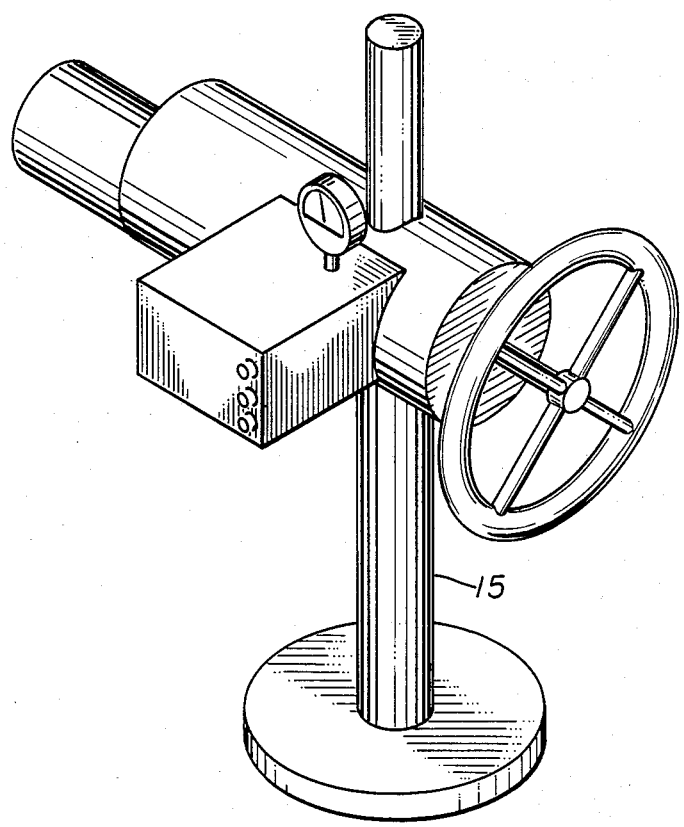
FIG. 3 is a simplified pictorial view of the gate operator in FIG. 1.
Figure 4:
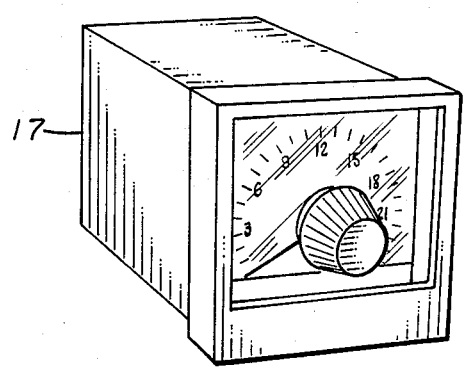
FIG. 4 is a perspective view of the controller shown in FIG. 1.
Figure 5:
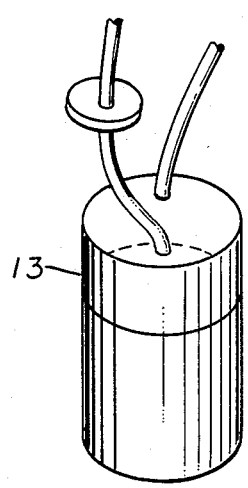
FIG. 5 is a simplified perspective view of the level transducer shown in FIG. 1.

The present invention is directed to a controller for use in controlling a gate operator for driving a control gate in an open channel which is constructed so as to compensate for dead time; i.e. the time difference between when a change is made in the gate position and when the change produced thereby is observable at a location remote from the control gate where the water level is measured. The present invention accomplishes this by coupling the controller to the gate operator through a relay which is energized by an oscillator driven time proportioning comparator so that the control signal is fed to the control gate in a cyclic fashion only. Thus after a change in the gate position is made, the controller is placed in an "off" position for a period of time to allow the channel to stabilize to that change.

When used in conjunction with a weir or a flume, the controller can provice flow control.

Referring now to FIG. 1 there is illustrated a block diagram of a controller system constructed according to the teachings of the present invention and identified generally by reference numeral 11.

Controller system 11 includes a level transducer 13 for monitoring the water level in an open channel at a location a predetermined distance from a control gate, and outputting an electrical signal proportional to the actual water level, a gate operator 15 for changing the position of the control gate, i.e. raising or lowering the control gate so as to adjust the amount of water passing into the open channel and a flow compensated controller 17 for controlling the operation of the gate operator 25 pursuant to the signals received from the transducer 13.

Transducer 13 may be located upstream or downstream of controller 17 but must be located far enough from the control gate to be away from the drawback region just above the control gate or the turbulence just below the control gate. Ideally, it should take at least one minute, but not more than five minutes for a change in gate position to be seen as a change in water level at the transducer location.

Gate operator 15 must have limit switches to stop the gate at its fully open and fully closed positions, must be geared to change the gate position very slowly and must have a position-indicating slidewire having a value in the vicinity of 100 to 1000 ohms to indicate the actual gate position.

Referring now to FIG. 2 there is illustrated a block diagram of the controller 17.

Controller 27 includes a first input port 19 for receiving an electrical signal from transducer 13 corresponding to the actual water level at the location of transducer 13, a second input port or set point port 21 for receiving an electrical signal from a set point unit 23 corresponding to the desired level to be maintained at the location of transducer 13, a third input port 25 for receiving AC power from a source (not shown) and a fourth inlet port 27 for receiving DC power from a source (also not shown). Inlet 25 is connected to a power supply 29 used to operate controller 17 through a master port 30.

The signal received at first input port 19 is fed into an input amplifier 31 where it is amplified while the signal received at second input port 21 is fed into a set point amplifier 33 where it also is amplified. The output of input amplifier 31 and set point amplifier 33 are fed into an error amplifier 35 which produces an output signal at point 37 corresponding to the difference between the signal from input amplifier 31 and set point amplifier 33. The output signal from input amplifier 31 is also fed into a meter driver 39 which is connected to a meter 41 for displaying the actual water level. The output signal from input amplifier 31 may also be fed into a process signal output 43 which is coupled to an auxiliary output port 45, where it may be transmitted to another location and/or to a computer or other device for further processing or storage.

The output signal of error amplifier 35 is fed into a proportional amplifier 47 and an automatic reset unit 49, this latter unit being actually an intergrator. The output of proportional amplifier 47 and the automatic reset unit 49 are fed into a summing amplifier 51 where the signals are summed. The output of summing amplifier 51 is fed into a motor modulation driver 53 which is used to drive the motor in the gate operator 15 in the manner as will be hereinafter described. As can be seen, motor modulator driver 53 is coupled to first and second relays 55 and 57, respectively. Relay 55 is operatively arranged to move the gate in one direction while relay 57 is operatively arranged to move the gate in the other direction.

As can be appreciated, the construction of controller 17 as described above is a conventional controller.

According to the present invention, the controller 17 further includes means to compensate for dead time, or off time, to allow the effect of a change made in the gate position to be observable at the measuring point where transducer 13 is located. The means includes a time proportioning comparator 59, an oscillator 61 and a third relay 63. Time proportioning comparator 59 has its input connected to the output of oscillator 61. The output of time proportioning comparator 59 is coupled to the automatic reset unit 49 and also to third relay 63. Third relay 63 is coupled between the control power line which supplies control power to the gate operator 15 and the two relays 55 and 57.

Time proportioning comparator 59 performs two functions. One function that time proportioning comparator 59 performs is to disable controller 17 to make changes in gate position during one period i.e. the "off" period, so that the control signal from controller 17 will not reach gate operator 15 and enable controller 17 to make changes in gate position during the other period i.e. "on" period, through relay 63, with the "off" period and "on" period being controlled by oscillator 61. Thus, when relay 63 is open, there is no control power going to gate operator 15 and controller 17 is effectively disabled and when relay 63 is closed, controller 17 is enabled and control power may pass to gate operator 15. The other function that time proportioning comparator 59 performs is to disable the integrator in the automatic reset unit 49 during the "off" period so that it will not accumulate errors during the time period in which errors are not to be accumulated.

Thus, after a first change has been made in the gate position, a second change will not be made until the water in the canal has had an opportunity to stabilize its level pursuant to the first change.

It should be noted that controller 17 could be used as a flow controller, if desired, that could be calibrated in terms of flow if the hydraulic characteristics of the channel were known. It should also be noted that transducer 13 can be located either upstream or downstream from the control gate.

As can also be appreciated, the invention could also be implemented in the form of a digital computer rather than an analog computer as shown.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

In recapitulation, it is seen that the operator of the instant controller is unique. It switches between computing and not computing, or controlling and not controlling based on an adjustable cycle that is keyed to the time it takes for water to go down the canal.

The instant device makes an adjustment, waits a period of time as determined by the timing circuits, and then after this finite amount of time goes by, it makes a readjustment. During this interval of time, the canal has gone from a first steady state condition to a second steady state condition. Thus the controller does not make adjustments during transition time, but when steady state is achieved. Once the water level readjusts itself to the new gate position, then the device goes ahead and reacts to this new level in the canal in the manner desired.

What is claimed is:

1. A flow compensated controller for use in controlling the position of a control gate in an open channel in order to maintain the water level either upstream or downstream from said control gate at a desired level, said flow compensated controller comprising:
   a. a first input port for receiving an electrical signal related to the actual water level,
   b. an input amplifier for amplifying said signal received at said first input port,
   c. a second input port for receiving an electrical signal corresponding to the desired level,
   d. a set point amplifier for amplying said signal received at said second input port,
   e. an error amplifier coupled to the output of said input amplifier and said set point amplifier for generating an error signal corresponding to the difference between said output of said input amplifier and said set point amplifier,
   f. a proportional amplifier coupled to the output of said error amplifier means for generating an output signal proportional to the output signal of the error amplifier,
   g. an automatic reset unit coupled to the output of the error amplifier for integrating the output signal of the error amplifier and providing an output indicative thereto,
   h. a summing amplifier for summing the output signals of the error amplifier and the automatic reset unit,
   i. a motor modulation driver coupled to the output of the summing amplifier for generating a modulated control signal for driving the gate operator, j. a first relay coupled to the output of the motor modulation driver for moving the gate in one direction, k. a second relay coupled to the output of the motor modulation driver for moving the gate in another direction, l. a third relay coupled between said first and second relays and said gate operator, m. a time proportioning comparator coupled to the input of said automatic reset unit automatic reset unit and coupled to said third relay, and n. an oscillator for driving said time proportioning comparator.

2. The controller of claim 1 and further including a meter for displaying the actual level and a meter driver coupled to the output of the input amplifier and the input of the meter.

3. The controller of claim 2 and further including a power supply for providing power to said unit.

4. The controller of claim 3 and further including a slidewire feedback coupled to the input of the motor for providing a signal related to the actual position of the gate.

5. The controller of claim 4 and further including an auxiliary output port coupled to the output of the input amplifier.

6. A flow compensated controller for use in controlling the position of a control gate in an open channel in order to maintain the water level either upstream or downstream from said control gate at a desired level, said flow compensated controller comprising:

a. a means for generating an error signal corresponding to the difference between the desired water level in the channel and the actual water level, b. a proportional amplifier means coupled to the output of the error signal generating means for generating an output signal proportional to the output signal of the error signal generating means for use in driving said control gate, and c. a means for cyclically enabling or disabling the output signal from the proportional amplifier means so that the output signal is emitted only on a cyclic basis.

7. The flow compensated controller of claim 6 and wherein the means for cyclically enabling or disabling the output signal from the proportional amplifier means comprises:

a. a time proportioning comparator, b. an oscillator for driving the time proportioning comparator, and c. a relay.

8. A method of controlling the position of a control gate in an open channel in order to maintain the water level either upstream or downstream from said control gate at a desired level, comprising:

a. generating an error signal corresponding to differences between the actual water level and the desired water level in the channel, b. generating an output signal related to the error signal indicating a change to be made in said water level, c. moving said control gate in accordance with said output signal, and d. allowing said water level in said channel to stabilize to said change before allowing a subsequent change to be made.

* * * * *